Nov. 22, 1955     J. R. HARRIS     2,724,780
INHIBITED TRIGGER CIRCUITS
Filed Oct. 31, 1951
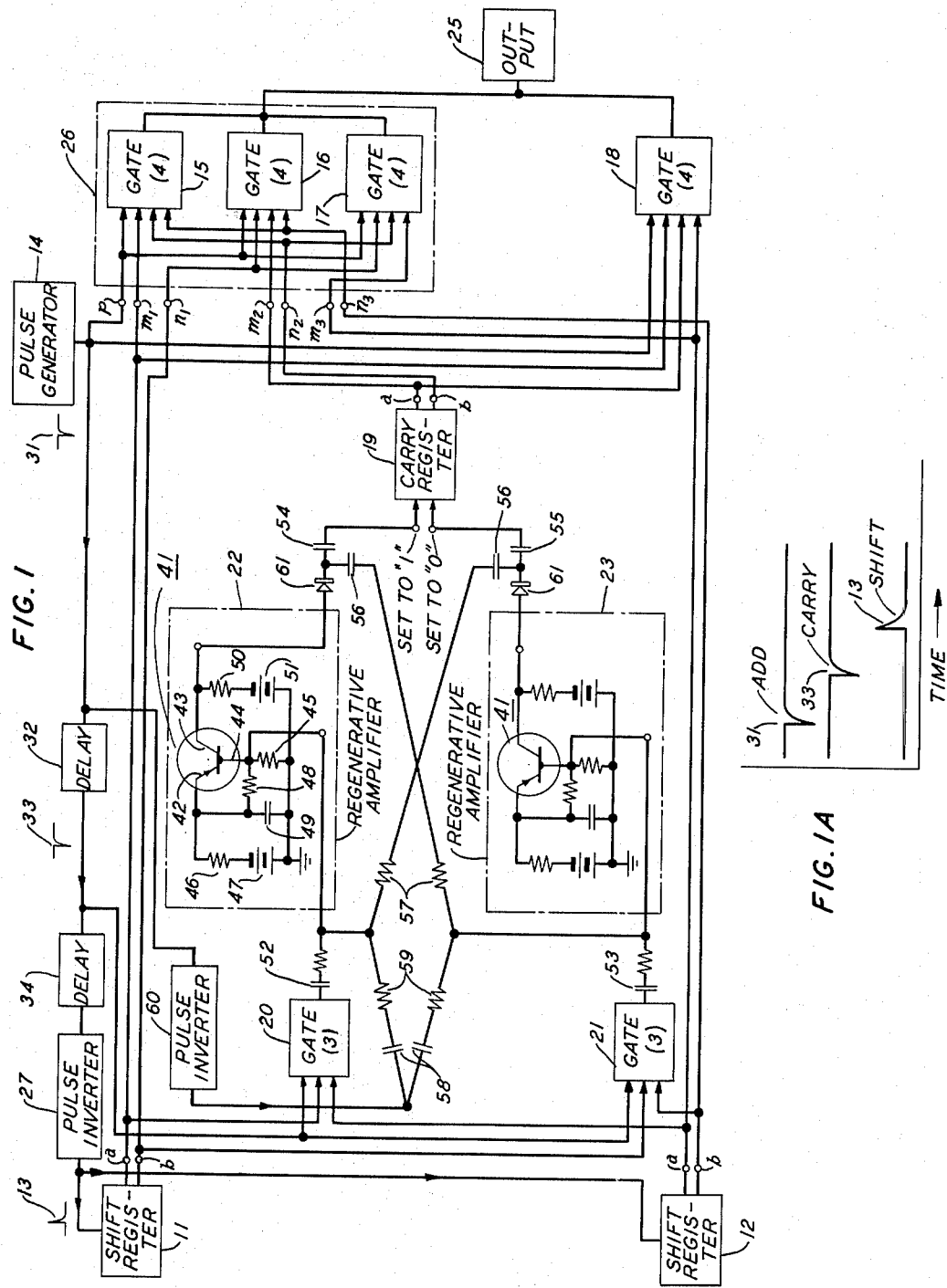
FIG. I
FIG. IA
INVENTOR
J. R. HARRIS
BY
ATTORNEY

United States Patent Office 2,724,780
Patented Nov. 22, 1955

2,724,780
INHIBITED TRIGGER CIRCUITS

James R. Harris, Dover, N. J., assignor to Bell Telephone Laboratories, Incorporated, New York, N. Y., a corporation of New York Application October 31, 1951, Serial No. 254,101

9 Claims. (Cl. 307—88.5)

This invention relates to trigger circuits and, more particularly, to circuits for preventing false triggering of interconnected trigger circuits by voltage changes at their outputs.

There are many types of trigger circuits now known in the art involving, for example, vacuum tubes, gas tubes, and semiconductor devices. Some of these circuits employ two tubes or devices per circuit, for example, those using the well-known Eccles-Jordan configuration or variations thereof, while others employ but one device per stage, as for example, the transistor trigger circuit disclosed in a copending application of A. J. Rack, Serial No. 79,861, filed March 5, 1949.

The trigger circuits of particular interest herein are either monostable or bistable. Many of these circuits may be triggered at any one of several points in the circuit, the point chosen for an input in a particular application being dependent on such considerations as impedance matching and the polarity and voltage levels available for triggering. The point from which useful output is derived is dependent on similar considerations.

In certain applications, such as digital computers, several trigger circuits may be connected to control a common trigger circuit, an output of each of the controlling circuits being connected to an input of the controlled circuit. If the control trigger circuits are sensitive to voltage changes on their outputs, idle units may be triggered falsely by the voltage changes at their outputs which occur when the controlled circuit changes state in response to a trigger pulse from an active unit. Such false triggering is obviously undesirable.

There have been suggestions involving the insertion of series diodes in each of several multipled circuits to isolate the various circuits from each other while still permitting transmission of desired signals. In some applications, however, such means are not usable, for example, where the desired output current pulses have the same polarity as the current changes which induce the false triggering, since in this case the diodes cannot discriminate between the two. Shunt diodes may be useless for isolation if the quiescent voltage level is not well fixed.

It is an object of the invention to prevent false triggering of interconnected trigger circuits.

A more specific object of the invention is to prevent voltage changes at the idle inputs of a multistate device from triggering trigger circuits whose outputs are connected to such idle inputs when a trigger circuit feeding another input of the multistate device causes the latter to change its state.

Another object of the invention is to inhibit idle trigger circuits in a system having a plurality of multipled trigger circuits.

In the illustrative embodiment described in detail below, a pair of monostable trigger circuits which are sensitive to voltage changes on their outputs are connected to the two inputs of a carry register in a serial adder. The first of these trigger circuits, which are referred to as regenerative amplifiers below, will, when triggered, set the carry register to indicate a carry of "1," if not already in this state; while the other trigger circuit is connected to set the register to "0," if not already so set. To prevent the voltage change at the idle input of the register from triggering its associated trigger circuit when the other trigger circuit has caused the register to change its state, the inputs and outputs of the two trigger circuits are cross-connected. The particular trigger circuits described below are triggered by negative input voltage pulses and produce positive output voltage pulses when triggered. The cross-connections, therefore, apply a positive inhibiting voltage from the output of the active trigger circuit to the input of the idle trigger circuit, holding it relatively insensitive to voltage changes on its output during the interval required to reset the carry register.

The invention, its objects, and features will be better understood from a consideration of the following detailed description when read in accordance with the attached drawing, in which:

Fig. 1 is a schematic diagram of a serial adder embodying principles of the present invention; and Fig. 1A illustrates the programming of the control pulses in the circuit of Fig. 1.

The serial binary adder shown in Fig. 1 is generally as described in a copending application of L. W. Hussey, Serial No. 227,059, filed May 18, 1951. The disclosure of this application is hereby incorporated in the present disclosure for a more detailed description of the adder than the one which follows. This adder is adapted to add a pair of numbers in binary form which are stored in the shift registers 11 and 12. The sum is produced a digit at a time, least significant digit first, on the output lead of the adder which is connected to the output 25. The numbers in shift registers 11 and 12 may each have several digits. The least significant digits appear in the registers at the output terminal $a$ of each register as one of two voltage levels. These voltage levels represent the binary characters "1" and "0." Each of the registers 11 and 12 produces symmetrical outputs so that if the voltage representing a "1" is at one output terminal of a register, the voltage representing a "0" is present at the other terminal. Therefore, the logical negatives of the digits to be added are always present at terminals $b$. The use of registers having such an output eliminates the need for inverters which might otherwise be necessary in the adder. The positive shift pulse 13 which originates as a negative pulse at the pulse generator 14 and which is inverted by the pulse inverter 27 shifts the digits in the registers from left to right so that digits of increasingly higher significance sequentially appear at the terminals $a$ of the registers. Shift registers are described, for example, in an article entitled "Digital Computers," by West and De Turk, which appears in the Proceedings of the I. R. E. for December 1948. The voltage levels which indicate the binary characters may, for example, be both positive, both negative, or one positive and one negative. In the present illustration, these levels will be referred to by the binary numbers they represent, viz., "1" and "0." Further, in the illustrative embodiments, they are both negative, the "1" condition being the more negative of the two.

The desired digits of the complete sum are produced by means of gates 15, 16, 17, and 18. These gates each have four enabling inputs, the arrowhead at each input indicating "enabling," and respond with an output only if all four inputs are simultaneously enabled; they are therefore called "four-control threshold four," the parenthetical number in the drawing indicating the threshold level. Just as with adding on paper, the desired digit, for each adding operation, is the least significant digit formed by adding the original digits and the carry digit from the previous operation.

For the present, the enabling inputs supplied from the pulse generator 14 will be omitted from consideration so that the gates 15—18 may, for the time being, be considered as three-control threshold three gates. Further, the gates 15, 16, and 17 together perform the function of a "1-only" gate 26 having three inputs (still neglecting the inputs fed by the generator 14), i. e., this combination will produce an output when one and only one of its three inputs are enabled. The inputs of the gate 26 may be considered applied to the three terminals $m_1$, $m_2$, and $m_3$, as will be seen later; the digits applied to the terminals $n_1$, $n_2$, and $n_3$ are merely the logical negative of the digits applied at their associated terminal $m$ to avoid the need for either gate having inhibiting as well as enabling inputs or pulse inverters within the gate 26. Terminal $p$ is a programming input to which timing pulses from the pulse generator 14 are applied.

The carry digit is stored in a carry register 19 which may, for example, be a bistable circuit such as a flip-flop multivibrator. The carry register also produces a symmetrical output, the carry digit appearing at terminal $a$ and its logical negative at terminal $b$. The "set to 1" input of the carry register is enabled in response to the enabling of the three-control threshold three gate 20; the "set to 0" input is controlled by a similar gate 21. The regenerative amplifiers 22 and 23 are inserted between the carry gates and the carry register to provide necessary gain and will be described in more detail later.

The operation of the adder is briefly as follows. The binary digits from the numbers to be added and the carry digit are applied to three separate enabling inputs of both the "1-only" gate combination 26, inputs $m_1$, $m_2$, and $m_3$, and the gate 18. The inverse of each of the 3 digits is also applied to the "1-only" gate inputs $n_1$, $n_2$, and $n_3$. If the carry digit is a "0" and the digits to be added are "1" and "0," the "1-only" gate will be enabled and apply the digit "1" to the output 25. The gate 18 will not be enabled. If the digits to be added are both "1" and the carry digit is "0," neither the "1-only" gate 26 nor the gate 18 will be enabled, so that a "0" will be applied to the output. However, still neglecting the programming pulses, the carry gate 20 will be enabled, its inputs being connected to the terminals $a$ of the registers 11 and 12, and set the carry register to produce a "1" at its output terminal $a$ for the next succeeding adding operation. If the next pair of digits to be added are both "0," the "1" being stored by the carry will enable the "1-only" gate and apply a "1" to the output 25, and the gate 21 will be enabled by the logical negatives of the "0's," i. e., the "1's," at terminals $b$ of registers 11 and 12 to set the carry register back to "0." It may be seen that the carry register is reset when, and only when, the input digits are both "1" and the carry previously registered was a "0" or if the input digits are both "0" and the carry digit previously stored was a "1."

The operations described above occur sequentially under control of the pulse generator 14 and associated delays 32 and 34. A pulse 31 emitted by the program generator, the add pulse, is first applied to terminal $p$ of the "1-only" gate 26 and to an enabling input of the gate 18 to enable the gates 15—18, and the least significant digit of the sum of the original digits and the carry digit from the previous operation is obtained and delivered to the output 25. The same pulse, delayed by the delay circuit 32, and regenerated if desired, and now identified as the carry pulse 33, next enables the carry gates 20 and 21 to reset the carry register 19 if necessary. After a further delay provided by the delay network 34, which is sufficient to allow the carry to be reset, the same pulse, now identified as the shift pulse 13 and inverted by the pulse inverter 27, enables the shift registers to shift the digits of next higher significance to the outputs of the registers for the next adding operation. The cycle of operations is thus: (1) add; (2) carry; and (3) shift, and is illustrated by Fig. 1A.

The regenerative amplifiers 22 and 23 are generally of the type disclosed and claimed in a copending application of A. E. Anderson, Serial No. 166,733, filed June 7, 1950. The term "regenerative" is not used here in the sense connoting feedback, although the circuit does employ feedback, but as applied to pulse regeneration. Since the information present at the outputs of the gates 20 and 21 is of such simple form, "Yes" or "No," simple regeneration is employed rather than linear amplification. The amplifiers 22 and 23 are basically monostable trigger circuits producing at their outputs positive pulses when triggered at their inputs by negative pulses.

The amplifiers 22 and 23 each comprise a current multiplication transistor 41 having an emitter electrode 42, a collector electrode 43, and a base electrode 44. This trigger circuit is a modification of the trigger circuit disclosed in the above-mentioned Rack application and employs as a feedback element a fairly large resistor 45 which is connected in the base circuit. It is the resistor 45 which promotes the feedback which gives rise to the negative resistance and hence trigger properties of the circuit. The resistor 46 and the voltage of the emitter bias battery 47 are proportioned in accordance with other circuit constants to make the circuit monostable. The circuit is normally held OFF by current from the negative supply battery 47 which flows through the parallel combination of emitter back resistance and the emitter-to-base resistor 48. A negative input pulse applied to the base electrode 44, however, if of sufficient amplitude to overcome this current, will drive the circuit into its negative resistance region and cause the circuit to go through a useful cycle, eventually returning to its one stable operating point. The resistor 48 which shunts the emitter and base electrodes aids in stablizing the trigger point and also reduces recovery time in the negative emitter current region. The condenser 49, the collector supply resistor 50, and the base resistor 45 cooperate with the transistor in determining the duration of the output pulse. Condensers 52 and 53 are inserted between the gates 20, 21 and the amplifiers 22, 23 to prevent transmission of direct current. Coupling condensers 54 and 55 are connected between the outputs of the regenerative amplifiers and the input terminals of the carry register 19 and block direct current between the outputs of the amplifiers and the carry register inputs. The diodes 61 isolate the carry register inputs from the negative-going trailing edges of the output pulses produced by the amplifiers 22 and 23.

The trigger circuits which comprise regenerative amplifiers 22, 23 are an example of trigger circuits which are sensitive to voltage changes in their outputs, since these circuits will trigger not only with a negative voltage pulse on the base electrodes but also with a negative voltage pulse of sufficient amplitude on the collector electrodes. If, for example, the carry register is storing a "1" and the gate 21 is enabled so as to trigger the regenerative amplifier 23, which in turn enables the "set to 0" input of the carry register to cause it to change state, the voltage at the idle "set to 1" input may change negativeward sufficiently to trigger the amplifier 22 on its output. Were the means contemplated by the present invention not employed, this would very likely result in the carry register being returned to its state manifested by "1" at its output terminal $a$. In accordance with the present invention, however, the outputs and inputs of the regenerative amplifiers 22 and 23 are cross-connected by means of the coupling condensers 56 and resistors 57. Therefore, when the amplifier 23 is triggered to produce a positive output pulse, this latter pulse is applied to the input terminal of the amplifier 22 as well as to the input of the carry register 19. This positive pulse on the input of the amplifier 22 will drive it even farther into the OFF region and thereby render it relatively insensitive to voltage changes on its output. Likewise, when the amplifier 22 is enabled, the amplifier 23 will be inhibited by the output produced by the amplifier 22.

It may be noted that it would be difficult to perform the same function by isolation diodes connected in the outputs of each of the regenerative amplifiers. This results because the normal output of the amplifiers is a positive voltage pulse, yet the voltage pulses to which the outputs are sensitive are negative. Series diodes must be poled so as to present a low impedance to the output pulse current. It may be seen that a series diode poled to pass a positive voltage pulse in one direction of transmission will necessarily present a low impedance to a negative voltage pulse in the opposite direction. The use of shunt isolation diodes is difficult due to the variability of the quiescent voltage at the output terminal of the trigger circuit. The range of variation is of the same order as the nominal output pulse and much larger than the voltage step which may trigger at the output.

False triggering of the regenerative amplifiers 22 and 23 has also been found to occur sometimes when the negative add pulse is applied to the add gates 15, 16, 17, and 18. This has been traced to a negative voltage which is passed back from these add gates through the carry register 19 to the outputs of the amplifiers 22 and 23. To prevent this latter false triggering, a positive pulse is applied to the inputs of the regenerative amplifiers during the add interval by means of the pulse inverter 60 and the condensers 58 and resistors 59. This pulse serves to inhibit the amplifiers 22 and 23 during the adding operation.

The principles of the present invention may be extended to more than two control trigger circuits. For example, if *n* trigger circuits were employed in such a manner that interaction among their outputs as described above were possible, a portion of the output of each trigger circuit could be applied to the input of each of the other trigger circuits, for example, through a condenser similar to condenser 56 and a resistor similar to resistor 57. The output of an active trigger circuit would therefore inhibit all idle trigger circuits and prevent voltage changes at the idle outputs from inducing false triggering. Further, pulse inverters could be added in an obvious manner, for example, between condensers 56 and resistors 57, if the polarity of the input trigger pulses is the same as the polarity of the output pulses produced when the circuits are triggered.

Although the invention has been described as relating to a particular embodiment, other modifications and embodiments will readily occur to one skilled in the art, so that the invention should not be deemed limited to the one specifically disclosed and claimed.

What is claimed is:

1. In combination, a plurality of trigger circuits, means to apply the output of each of said trigger circuits to an input of a common load circuit and means to also apply a portion of the said output of each of said trigger circuits to the input of each of the other trigger circuits with the proper polarity to inhibit each of said other trigger circuits.

2. The combination in accordance with claim 1 wherein each of said trigger circuits comprises as an active element a transistor.

3. In combination, a plurality of trigger circuits each having an input to which triggering pulses are applied and an output at which pulses are produced when its associated trigger circuit is triggered, said trigger circuits each being sensitive to voltage changes on their outputs, a voltage-responsive load circuit, means to apply the output of each of said trigger circuits to an input of said load circuit, said load circuit producing voltage changes at its input in response to output pulses from said trigger circuits, and means to apply a portion of the said output of each of said trigger circuits to the input of each of the other of said trigger circuits with the proper polarity to oppose the said voltage changes to which the said trigger circuits are sensitive.

4. In combination, a bistable trigger circuit having a first and a second input to which triggering pulses can be applied, means to produce said triggering pulses comprising a pair of trigger circuits, means to apply the output of a first of said trigger circuits to said first input of said bistable circuit, means to apply the output of a second of said trigger circuits to said second input of said bistable circuit, and means to prevent the said trigger circuits from being triggered by voltage changes at their outputs comprising means to apply a portion of the said output of each of said trigger circuits to the input of the other trigger circuit.

5. The combination in accordance with claim 4, wherein said last-named means comprises means to apply a portion of the said output of each of said trigger circuits to the input of the other trigger circuit with the polarity opposite to the polarity required to trigger the said trigger circuits at their inputs.

6. In combination, a two-state device having a first input which, when triggered, will set said device in one of its two states, if not already in said one state, and a second input which, when triggered, will set said device in the other of its two states, if not already in said other state, a first and a second trigger circuit each having an input and an output, means to apply triggering pulses to the said inputs of said trigger circuits, means to apply the outputs of said trigger circuits to the said first and second inputs, respectively, of said two-state device, and means to apply a portion of the output of each of said trigger circuits to the input of the other trigger circuit with a polarity opposite to the polarity of said triggering pulses.

7. In combination, a bistable circuit having a pair of inputs each having a voltage which changes when the stable state of said bistable circuit is changed in response to an input applied to one of said inputs, a first and a second source of triggering pulses, means for applying triggering pulses from each of said sources to one of the inputs of said bistable circuit comprising, a first and a second regenerative amplifier each comprising a monostable trigger circuit having an input and an output, means for applying triggering pulses from each of said sources to the input of one said monostable trigger circuits, said trigger circuits each producing an amplified pulse at their output in response to each input triggering pulse and each triggerable also in response to voltage changes applied to their output, means for applying the outputs of said monostable trigger circuits to different inputs of said bistable circuit, and means for inhibiting the triggering of an idle monostable circuit by a voltage change at the input of said bistable circuit to which said idle monostable trigger circuit is connected comprising means for applying the output of each of said trigger circuits to the input of the other trigger circuit with the proper polarity to inhibit triggering.

8. The combination in accordance with claim 7 wherein said regenerative amplifiers each comprise a monostable transistor trigger circuit.

9. In combination, a pair of voltage responsive trigger circuits each having an input and an output and each producing output pulses when triggered, means for applying triggering pulses to each of said inputs, a voltage responsive load circuit having at least two inputs and at least two stable states, means for altering the stable state of said load circuit comprising means for applying the said output pulses of a first of said trigger circuits to a first input of said load circuit and means for applying the said output pulses of a second of said trigger circuits to a second input of said load circuit, said load circuit, when altered by a pulse applied to one of its inputs, producing a voltage change at each of its other inputs, and means for preventing false triggering of said trigger circuits in response to said last named voltage changes comprising means for applying the output pulses produced by each of said trigger circuits to the input of each other trigger circuit with a polarity opposite to the polarity of said triggering pulses.

References Cited in the file of this patent

UNITED STATES PATENTS

| | | |
|---|---|---|
| 2,306,386 | Hollywood | Dec. 29, 1942 |
| 2,477,047 | Davis | July 26, 1949 |
| 2,482,932 | Pyatt et al. | Sept. 27, 1949 |
| 2,536,808 | Higinbotham | Jan. 2, 1951 |
| 2,551,119 | Haddad et al. | May 1, 1951 |